United States Patent
Meixler

(10) Patent No.: US 10,382,389 B2
(45) Date of Patent: Aug. 13, 2019

(54) SYSTEM AND METHOD FOR SMTP AND ALTERNATIVE EMAIL PROTOCOL INTEROPERABILITY

(71) Applicant: MEIXLER TECHNOLOGIES, INC., New Hope, PA (US)

(72) Inventor: Michael A. Meixler, New Hope, PA (US)

(73) Assignee: Meixler Technologies, Inc., New Hope, PA (US)

( * ) Notice: Subject to any disclaimer, the term of this patent is extended or adjusted under 35 U.S.C. 154(b) by 285 days.

(21) Appl. No.: 14/914,367

(22) PCT Filed: Mar. 28, 2014

(86) PCT No.: PCT/US2014/032175
§ 371 (c)(1),
(2) Date: Feb. 25, 2016

(87) PCT Pub. No.: WO2015/053812
PCT Pub. Date: Apr. 16, 2015

(65) Prior Publication Data
US 2016/0212093 A1      Jul. 21, 2016

Related U.S. Application Data

(60) Provisional application No. 61/889,665, filed on Oct. 11, 2013.

(51) Int. Cl.
*H04L 29/12* (2006.01)
*G06F 16/9535* (2019.01)
(Continued)

(52) U.S. Cl.
CPC ...... *H04L 61/1564* (2013.01); *G06F 16/9535* (2019.01); *H04L 51/066* (2013.01);
(Continued)

(58) Field of Classification Search
CPC ... H04L 61/1564; H04L 51/28; H04L 51/066; H04L 69/08; H04L 67/28; H04L 51/14; G06F 17/30867
See application file for complete search history.

(56) References Cited

U.S. PATENT DOCUMENTS 5,822,526 A * 10/1998 Waskiewicz .......... H04L 61/307
                                                  709/206
7,657,598 B2   2/2010 Daniell et al.
(Continued)

FOREIGN PATENT DOCUMENTS

WO        0068812 A1    11/2000
WO     2012158053 A1    11/2012

OTHER PUBLICATIONS

RFC 821 Simple Mail Transfer Protocol, Jonathan B. Postel, Information Sciences Institute, Aug. 1982.
(Continued)

*Primary Examiner* — Chris Parry
*Assistant Examiner* — Caroline H Jahnige
(74) *Attorney, Agent, or Firm* — Caesar Rivise, PC

(57) ABSTRACT

A system and method for migrating from the legacy SMTP protocol to an alternative email protocol, such as Bitmessage protocol, for sending email messages comprising a publicly accessible directory which associates the alternative email protocol addresses with an SMTP addresses of a particular recipient, and a server that accepts an outgoing message sent by SMTP protocol and routes the outgoing message via the alternative email protocol if recipient's SMTP address and a corresponding alternative email protocol address is found in the directory, and routes the message by SMTP protocol if no corresponding alternative email protocol address is found in the directory.

22 Claims, 3 Drawing Sheets

(51) Int. Cl.
*H04L 12/58* (2006.01)
*H04L 29/08* (2006.01)
*H04L 29/06* (2006.01)

(52) U.S. Cl.
CPC .............. *H04L 51/28* (2013.01); *H04L 51/14* (2013.01); *H04L 67/28* (2013.01); *H04L 69/08* (2013.01)

(56) References Cited

U.S. PATENT DOCUMENTS

| | | | |
|---|---|---|---|
| 7,765,285 B2 | 7/2010 | Yoshida et al. | |
| 8,041,953 B2 | 10/2011 | Spies et al. | |
| 8,145,715 B2 | 3/2012 | Henry et al. | |
| 2002/0129275 A1* | 9/2002 | Decuir | H04L 63/0428 726/28 |
| 2003/0172300 A1 | 9/2003 | Parry | |
| 2009/0030993 A1 | 1/2009 | Rachal et al. | |
| 2011/0060804 A1* | 3/2011 | Alfke | H04L 12/581 709/206 |
| 2012/0304261 A1* | 11/2012 | Justice | G06Q 10/107 726/5 |
| 2013/0144951 A1* | 6/2013 | Viswanath | H04L 29/08 709/204 |
| 2013/0246549 A1 | 9/2013 | Adams et al. | |

OTHER PUBLICATIONS

Hypertext Mail Protocol a/k/a Stubmail, Nathan Cheng, Feb. 18, 2006, http://www.circleid.com/posts/hypertext_mail_protocol_aka_stub_emaill/.
Turning Email Upside Down: RSS/Email and IM2000, Georgia Tech Talks Jul. 23, 2007, http://www.youtube.com/watch?v=Kp79SZaKcLg.
AMTP a replacement for SMTP, Dec. 2, 2008, http://amtp.bw.org/.
Replacing SMTP with XMPP, Jul. 2007, https://singpolyma.net/2007/07/replacing-smtp-with-xmpp/.
Bitmessage: A Peer-to-Peer Message Authentication and Delivery System, Jonathan Warren, Nov. 27, 2012.
A Phone for the Age of Snowden, The New Yorker, Jan. 30, 2014.
International Search Report for PCT/US2014/032175, dated Aug. 8, 2014.

* cited by examiner

ADDRESS TABLE

| IDENTITY | FIELD | TYPE | NULL | KEY | DEFAULT |
|---|---|---|---|---|---|
| RECIPIENT #1 | smpt_address | varchar (255) | NO | PRI | NULL |
| | bitmessage_address | varchar (255) | NO | PRI | NULL |

FIG. 2A

ADDRESS TABLE

| IDENTITY | FIELD | TYPE | NULL | KEY | DEFAULT |
|---|---|---|---|---|---|
| RECIPIENT #2 | smpt_address | varchar (255) | NO | PRI | NULL |

FIG. 2B

SMTP / BITMESSAGE ADDRESS PUBLIC DIRECTORY

Use the form below to register your SMTP email address and corresponding Bitmessage address in the public directory. This will enable people and systems to find your Bitmessage address given your SMTP address. The information in this directory is publicly available.

Enter your SMTP email address and your Bitmessage address in the fields below. A confirmation message containing a link will be sent to each of the addresses, to confirm that the addresses entered are valid. The listing will be active after you confirm both addresses by clicking the links.

SMTP Email Address: [            ] (ex: johnsmith@aol.com)
Bitmessage Address: [            ]
　　　　　　　　　(ex: BM-orkCbppXWSqPpAxnz6jnfTZ2djb5pJKDb)
[Submit]

FIG. 3

SYSTEM AND METHOD FOR SMTP AND ALTERNATIVE EMAIL PROTOCOL INTEROPERABILITY

CROSS-REFERENCE TO RELATED APPLICATIONS

This U.S. national phase application claims the benefit under 35 U.S.C. § 371 of PCT Application No. PCT/US2014/032175 filed on Mar. 28, 2014, which in turn claims the benefit under 35 U.S.C. § 119(e) of Provisional Application Ser. No. 61/889,665 filed on Oct. 11, 2013 entitled SYSTEM AND METHOD FOR SMTP AND ALTERNATIVE EMAIL PROTOCOL INTEROPERABILITY and all of whose entire disclosures are incorporated by reference herein.

BACKGROUND OF THE INVENTION

This present invention relates generally to electronic communications and, more particularly, to a system and method for enabling users to migrate from the legacy SMTP protocol to an alternative email protocol, e.g., Bitmessage protocol.

Following the widespread adoption of the Internet, electronic mail is now a widely used method for communicating written information, used by billions globally. The protocol generally used by email software and systems to deliver email messages from senders to recipients through a packet-switched network is known as SMTP (Simple Mail Transport Protocol). The specification for SMTP was originally described in a publication known as RFC821 in 1982.

Impressively, now more than 30 years later, SMTP largely as defined in RFC821, is still widely used by email software and systems as the standard protocol for transporting email. However, while ahead of its time in 1982, SMTP has a number of inherent limitations which hinder its usability in today's world.

First and foremost, the widespread problem of junk email (known as 'spam') and consequently the use of spam filters to combat spam, have resulted in SMTP being unreliable. Spam filters are known to routinely flag legitimate messages as spam erroneously, resulting in these messages not being delivered to their intended recipients, many times unbeknownst to both the senders and the recipients of these messages. Many users feel that SMTP is unreliable because of this problem, and it is not uncommon for people in the technical community to express that SMTP is now 'broken' for this reason.

Another limitation of SMTP is that SMTP lacks a built-in method for authenticating the sender of a message. Because of this limitation, malicious senders are able to construct email messages appearing to originate from senders other than themselves. This technique, known as 'spoofing', is often exploited by spammers when sending large numbers of unsolicited and often malicious 'phishing' email messages.

Another limitation of SMTP is that it lacks built-in methods for enabling end-to-end encryption of messages, and for digital signing of messages. Another limitation of SMTP is that it lacks built-in methods for enabling a sender to track the delivery of a message through the internet, and confirm the receipt of a message by the recipient. Another limitation of SMTP is that users of hosted email services (such as Yahoo Mail, Gmail, Comcast, etc.) cannot easily migrate to another email service without changing their email address, because SMTP email addresses are coupled to domains.

As a result, alternative email transport protocols have been developed such as IM200 which is a "push" email protocol proposed by D. J. Bernstein in 2000 (see http://cr.yp.to/im2000.html and http://en.wikipedia.org/wiki/Internet Mail 2000). Another alternative is Stubmail, a variant of IM2000 developed by Meng Weng Wong and Julian Haight. Wong is the founder of POBox.com (one of the first hosted email services) and is also the creator of the Sender Policy Framework (SPF) protocol used for spam control. Haight is the founder of SpamCop.net, which is now owed by Cisco. (See:http://www.circleid.com/posts/hypertext_mail_protocol_aka_stub_emaill/, http://www.youtube.com/watch?v=Kp79SZaKcLg). Additional alternatives include AMTP (seehttp://amtp.bw.org/) and XMPP (see https://singpolyma.net/2007/07/replacing-smtp-with-xmpp/).

By way of example only, in 2012, an alternative protocol for a Peer-to-Peer Message Authentication and Delivery System, named 'Bitmessage' was proposed and released to the public under the MIT open source license. The protocol is described at the website www.bitmessage.org, and in a whitepaper by its creator, Jonathan Warren, at https://bitmessage.org/bitmessage.pdf.

As can be seen in the whitepaper, Bitmessage is a decentralized peer-to-peer messaging protocol. The contents of messages, as well as non-content 'metadata', are encrypted by the system from end-to-end, without the need for users to exchange encryption keys and without the need for certificates or trusted authorities. Messages are digitally signed by their senders, the protocol prevents spoofing of senders' addresses, and the protocol includes built-in methods for tracking and delivery confirmation. The system also includes a built-in method for controlling spam and users' addresses are not coupled to domains.

For all of the above reasons, the Bitmessage protocol is likely to be seen as superior to the SMTP protocol by many users, and hence many users are likely to be inclined to migrate to Bitmessage. However, migration from SMTP to Bitmessage is complicated by the fact that the two protocols are disparate of one another. Mature, feature-rich desktop mail clients, mobile mail clients, and webmail clients used to send and receive SMTP messages cannot readily be used to send and receive Bitmessage messages. The programs currently available for Bitmessage support only basic functionality and lack many of the tools and features that users have come to expect for managing messages. The fact that the two protocols are independent of one another also presents the user with cumbersome burden of having to operate two programs for messaging—one for SMTP (for communicating with associates who have not yet migrated to Bitmessage) and one for Bitmessage (for communicating with associates who have migrated to Bitmessage). Also, there is currently no directory in place for users or systems to determine if another party is setup for Bitmessage, and if so, what their Bitmessage address is given their SMTP addresses.

Thus, there remains a need for a system and method for SMTP and alternative email protocol interoperability.

All references cited herein are incorporated herein by reference in their entireties.

BRIEF SUMMARY OF THE INVENTION

A system for delivering email messages over the Internet regardless of the email protocol is disclosed. The system comprises: an Internet-based directory that is publicly accessible, and wherein the directory comprises a plurality of records wherein each record associates a recipient with at least one simple mail transport protocol (SMTP) address and wherein each record may also associate each recipient with at least one alternative email protocol address (e.g., Bitmessage, IM2000, Stubmail, AMTP, XMPP, etc.); a server (e.g., physical or virtual) in communication with the Internet, wherein the server captures recipient identities of messages generated by at least one sender mail client and then queries the Internet-based directory to determine if each of the recipient identities includes a respective alternative email protocol address; and wherein the server routes any message through an alternative email protocol message transfer agent (MTA) to a corresponding recipient whenever the directory returns an alternative email protocol address associated with the corresponding recipient to the server query and wherein the server routes any message through an SMTP MTA whenever the directory returns an SMTP protocol address associated with the corresponding recipient to the server query.

A method for delivering email messages over the Internet regardless of the email protocol is disclosed. The method comprises: forming a publicly accessible directory having records wherein each record associates an email recipient with at least one simple mail transport protocol (SMTP) address and wherein each record may also associate each recipient with at least one alternative email protocol address (e.g., Bitmessage, IM2000, Stubmail, AMTP, XMPP, etc.); configuring a server, in communication with the Internet, to capture recipient identities of messages generated by at least one sender mail client and then to query the publicly accessible directory to determine if each of the recipient identities includes a respective alternative email protocol address; and routing any message, by the server, through an alternative email protocol message transfer agent (MTA) to a corresponding recipient whenever the directory returns an alternative email protocol address associated with the corresponding recipient to the server query and routing any message, by the server, through an SMTP MTA whenever the directory returns an SMTP protocol address associated with the corresponding recipient to the server query.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A shows the structure of an exemplary database record on the publicly accessible directory where a message recipient has both an SMTP address and an alternative email protocol address (e.g., a Bitmessage address);

FIG. 2B shows the structure of an exemplary database record on the publicly accessible directory where a message recipient has only an SMTP address;

FIG. 3 shows an exemplary data entry form for creating a database record on the publicly accessible directory.

DETAILED DESCRIPTION OF THE PREFERRED EMBODIMENTS

Figure 1:
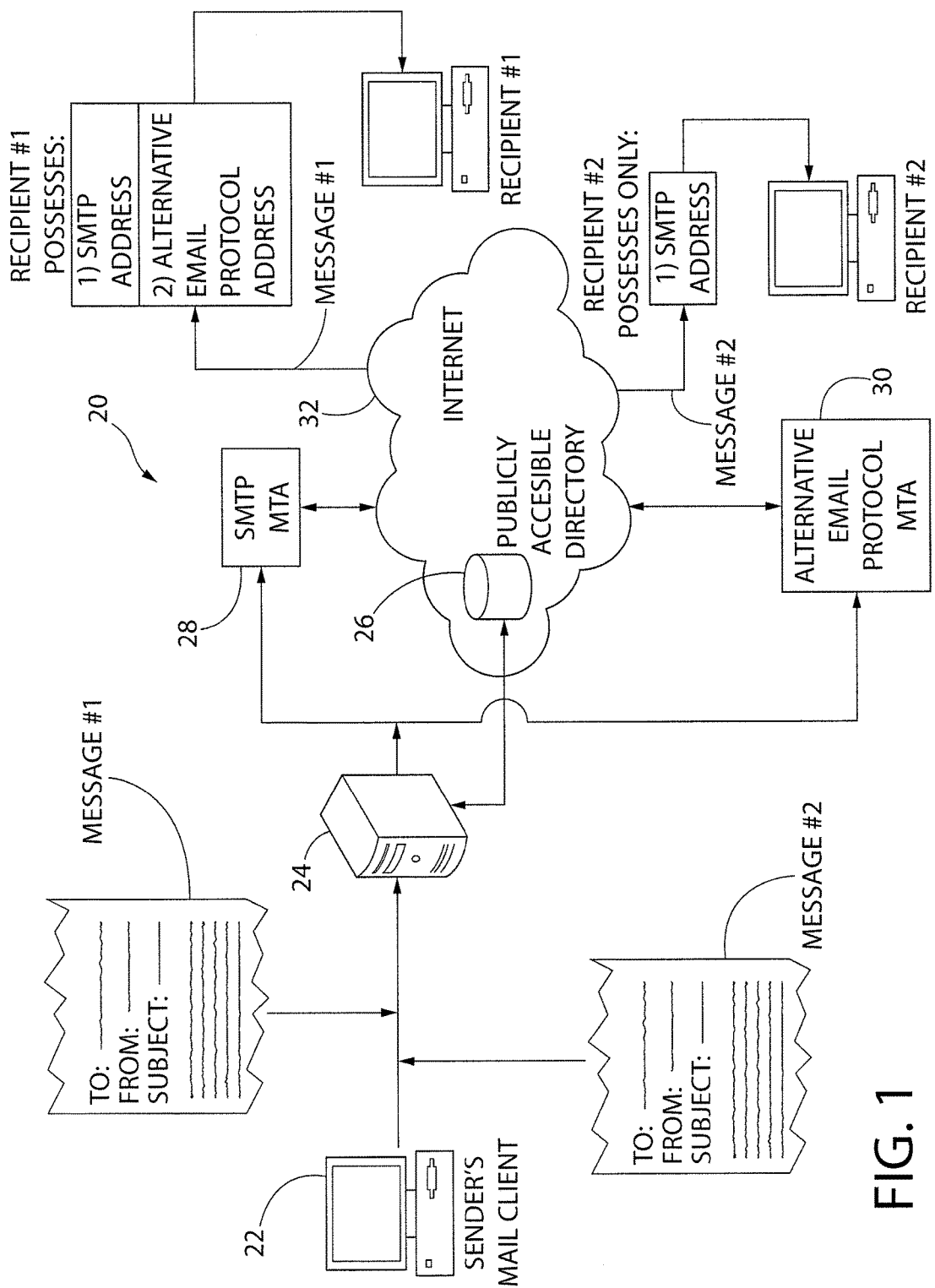
FIG. 1 shows a system diagram of the present invention wherein messages sent from a sender are seamlessly transmitted to recipients using alternative email protocol addresses, where available, or via SMTP by default.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

A solution to all of the above problems is a system and method that enables users to send alternative email protocol (e.g., Bitmessage; it should be understood that Bitmessage is being used here only by way of example; other alternative email protocols can be used) messages seamlessly, using the existing programs that are currently used for sending and receiving SMTP messages, coupled with a directory service that enables users to associate alternative email protocol (e.g., Bitmessage) addresses with SMTP addresses, and makes this information publicly available.

A system 20 and method for SMTP and alternative email protocol (e.g., Bitmessage) interoperability comprises (1) a publicly-accessible directory for associating Bitmessage addresses with SMTP addresses, and (2) a server through which outgoing messages are sent, initially by way of SMTP, whereby the server first queries the directory given the recipient's SMTP address to determine whether or not the recipient is registered in the directory, and if so, what their corresponding Bitmessage address is, then routes outgoing messages, originally sent by way of SMTP, by way of Bitmessage protocol if the recipient is registered in the directory, and by SMTP if not.

In particular, in FIG. 1, messages #1 and #2 originate from sender's mail client 22. Sender's mail client 22 is configured to use a server (e.g., physical or virtual) 24 as the outgoing SMTP server. Server 24 is capable of accepting an incoming SMTP connection and conducting an SMTP session. Each outgoing message #1 and #2, are sent by way of SMTP protocol to server 24. Server 24 stores the outgoing messages #1 and #2 and captures the recipients (viz., recipient identities) of the messages specified by mail client 22 in the SMTP RCPT TO command (or alternatively from the message headers) of each message #1 and #2. For each recipient, the server 24 queries a publicly-accessible directory 26 for a record given each recipient's SMTP address. If the directory 26 finds an alternative email protocol address record for that recipient, it returns the recipient's corresponding alternative email protocol (e.g., Bitmessage) address to the server 24 which then transmits the message to the recipient having that alternative email protocol address; if, on the other hand, the directory fails to identify an alternative email protocol address record for that recipient, the server 24 directs the message by the conventional SMTP message transfer agent (MTA) to the recipient. For example, as shown in FIG. 1, since Recipient #1 does possess an alternative email protocol address (see FIG. 2A, "bitmessage_address" by way of example only) which is stored in the publicly accessible directory 26, the server 24, upon receipt of the alternative email protocol address, delivers message #1 to Recipient #1 via the alternative email protocol MTA 30. On the other hand, since Recipient #2 only possesses an SMTP address (see FIG. 2B, i.e., when the server 24 queries the directory 26 and no alternative email protocol address is found), the server 24 routes the message #2 via the conventional SMTP MTA 28 to Recipient #2.

Thus, to the sender and the recipient, the pertinent messages are seamlessly transmitted and received.

It should be understood that the use of the term "sender's mail client" above does not exclude accepting messages originating by other means. Messages originating from webmail clients, mobile mail clients, automated/system generated messages, and other means, are also applicable.

The operation of the directory 26 is as follows, using Bitmessage address by way of example only:

(1) A database table with a structure shown in FIGS. 2A-2B is used to store users' SMTP email address and their corresponding alternative email protocol addresses (e.g., Bitmessage address). Users may enter their SMTP email address and corresponding alternative email protocol (e.g., Bitmessage) address in a registration form, accessible via the world wide web, such as the one shown in FIG. 3, which shows a datafield for Bitmessage address, by way of example only. After the address datafields are entered, the validity of the addresses is confirmed by sending messages to both addresses (via SMTP protocol to the SMTP address, and via Bitmessage protocol to the Bitmessage address), each containing a unique link. After the user clicks the links sent to each address, confirming that the addresses that he/she entered are in fact valid, the address pair is stored in the ADDRESS database table shown in FIGS. 2A and 2B. It should be noted that the table structure is a many-to-many relationship. One SMTP address may have multiple corresponding Bitmessage addresses; and multiple SMTP addresses may have the same corresponding Bitmessage address. Users may use the exemplary form of FIG. 3 to enter their SMTP email address and corresponding Bitmessage address for submission into the public directory. It should be understood that FIG. 3 is by way of example only and that any and all other means for entering SMTP email addresses and corresponding alternative email protocol (e.g., Bitmessage) addresses into the directory 26 are within the scope of this invention 20. For example, the address pairs may be mass-loaded using a standard file format such as XML or CSV; the address pairs could be entered by way of an API (e.g., a web services API); etc.

(2) The directory 26 is publicly accessible and can be queried by a remote system through the Internet. One embodiment of the query function would be by way of a web services API over HTTP or HTTPS. An API query might be in the form shown below:

http(s)://hostname.domain.tld/
      doquery.php?smtpaddress=johnsmith@aol.com

It should be understood that the HTTP or HTTPS is also by way of example only and that other means of querying the directory 26 are within the broadest scope of this invention; other means of querying the directory 26 are possible as well.

Where, in this case, a query is being submitted to request the Bitmessage addresses that corresponds with johnsmith@aol.com. Upon receiving the query, the system 20 then queries the ADDRESS database table for one or more records matching the given SMTP email address. If one or more records are found, the API returns a result in a standard format, such as XML (although other formats are available), as follows:

```
<xml>
    <record>
        <smtp_address>johnsmith@aol.com</smtp_address>
        <bitmessage_address> BM-2D825bHBMM2rKJHK2ThchWRN7C67GyypwD</bitmessage_address>
    </record>
</xml>
            If multiple Bitmessage addresses are found for the given SMTP address, one
            record for each Bitmessage address is produced in the result, as follows:
        (3) <xml>
                <record>
                    <smtp_address>johnsmith@aol.com</smtp_address>
                    <bitmessage_address> BM-
            2D825bHBMM2rKJHK2ThchWRN7C67GyypwD</bitmessage_address>
                </record>
                <record>
                    <smtp_address>johnsmith@aol.com</smtp_address>
                    <bitmessage_address> BM-orkCbppXWSqPpAxnz6jnfTZ2djb5pJKDb</bitmessage_address>
                </record>
            </xml>
```

If no records are found for the given SMTP address, an empty result set is returned, indicating that no records were found, as follows:

<xml>
   </xml>

Figure 4:
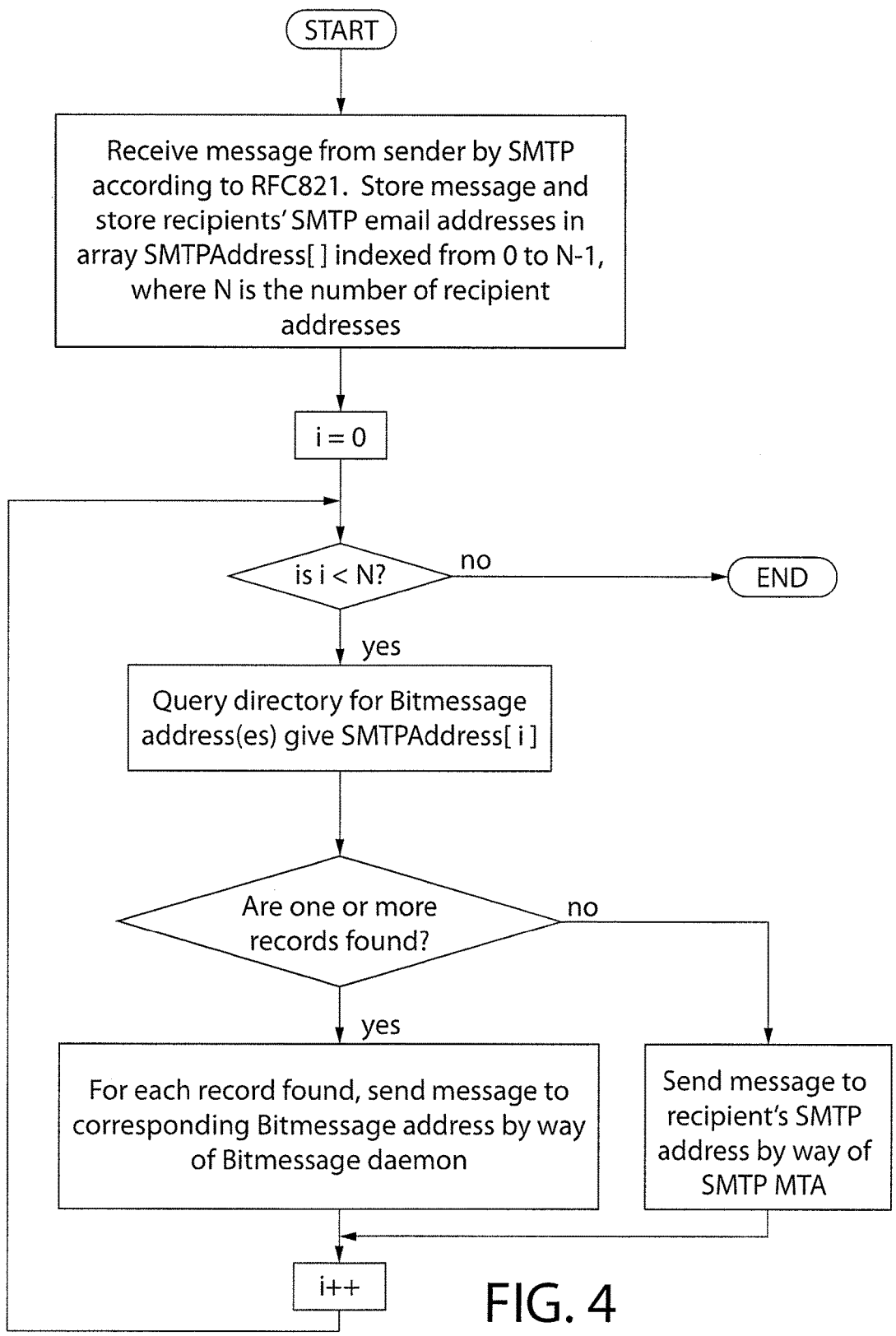
FIG. 4 shows, in flow diagram form, operation of the server of the present invention.

The operation of the server 24 is shown in the flowchart of FIG. 4. Again, use of Bitmessage is simply by way of example and the process is not limited only to Bitmessage. Implementing the functions in each of the blocks (including receiving incoming messages by SMTP, sending outgoing SMTP messages through an SMTP MTA 28, and sending outgoing Bitmessage messages through a Bitmessage daemon 30) are known in the art. In FIG. 4, RFC 821 refers to the standards which are followed for email identification. It should be understood that the server 24 is by way of example only and that it is within the broadest scope of the invention 20 to include any device or devices, either physical or virtual, that alone or together, implement the logic of FIG. 4. By way of example only, the server 24 may comprise an operating system (e.g., Linux) that runs a specialized program (e.g., written in Python or some other scripting language) to implement the logic of FIG. 4

All such modifications and variations are intended to be included herein within the scope of this disclosure.

While the invention has been described in detail and with reference to specific examples thereof, it will be apparent to one skilled in the art that various changes and modifications can be made therein without departing from the spirit and scope thereof.

What is claimed is:

1. A system for delivering email messages over the Internet regardless of the email protocol of the recipient, said system comprising:

a sender's mail client that initiates a message to at least one recipient at any domain using a simple mail transport protocol (SMTP) address;

an Internet-based directory that is publicly accessible, said directory comprising a plurality of records wherein each record associates a recipient with an SMTP address and with, if also stored within said record, at least one alternative email protocol address, said at least one alternative email protocol address being absent from the message initiated by the sender's mail client;

a server in communication with the Internet and connected to said sender's mail client, said server receiving the SMTP-addressed message from said sender's mail client via SMTP protocol and then said server capturing recipient identities of the message generated by said sender's mail client and then querying said Internet-based directory to identify an email protocol address associated with the recipient to send the message to the recipient; and wherein said server forwards the message over the Internet through an alternative email protocol if said server query identifies said at least one alternative email protocol address associated with the recipient instead of the message reaching a designated SMTP mail exchanger for the recipient's SMTP address, and wherein said server forwards the message over the Internet through SMTP email protocol to the recipient's designated SMTP mail exchanger only if said server query fails to identify said at least one alternative email protocol address.

2. The system of claim 1 wherein said alternative email protocol comprises Bitmessage.

3. The system of claim 1 wherein said alternative email protocol comprises IM2000.

4. The system of claim 1 wherein said alternative email protocol comprises Stubmail.

5. The system of claim 1 wherein said alternative email protocol comprises AMTP.

6. The system of claim 1 wherein said alternative email protocol comprises XMPP.

7. The system of claim 1 wherein said Internet-based directory comprises a data entry form for entering at least one alternative email protocol address.

8. The system of claim 1 wherein said Internet-based directory comprises a data entry form for entering at least one SMTP protocol address.

9. The system of claim 1 wherein said sender mail client comprises a webmail client.

10. The system of claim 1 wherein said sender mail client comprises a mobile mail client.

11. The system of claim 1 wherein said sender mail client comprises an automated/system for generating messages.

12. A method for delivering email messages over the Internet regardless of the email protocol of the recipient, said method comprising:

initiating a message from a sender's mail client to a recipient at any domain using simple mail transport protocol (SMTP);

forming a publicly accessible directory having records wherein each record associates an email recipient with at least one SMTP address and, if provided by the recipient, with at least one alternative email protocol address, said at least one alternative email protocol address being absent from the message initiated by the sender's email client;

configuring a server, in communication with the Internet and connected to said sender's mail client;

receiving the SMTP-addressed message, by said server, and then capturing recipient identities of the message generated by said sender's mail client;

querying, by said server, said publicly accessible directory to identify an email protocol address associated with the recipient;

forwarding, by said server, the message through an alternative email protocol over the Internet if said server query identifies said at least one alternative email protocol address associated with the recipient instead of the message reaching a designated SMTP mail exchanger for the recipient's SMTP address; and forwarding by said server, the message through SMTP email protocol over the Internet to the recipient's designated SMTP mail exchanger only if said server query fails to identify said at least one alternative email protocol address.

13. The method of claim 12 wherein said alternative email protocol comprises Bitmessage.

14. The method of claim 12 wherein said alternative email protocol comprises IM2000.

15. The method of claim 12 wherein said alternative email protocol comprises Stubmail.

16. The method of claim 12 wherein said alternative email protocol comprises AMTP.

17. The method of claim 12 wherein said alternative email protocol comprises XMPP.

18. The method of claim 12 wherein said step of forming a publicly accessible directory comprises permitting users to complete a data entry form identifying at least one alternative email protocol address.

19. The method of claim 12 wherein said step of forming a publicly accessible directory comprises permitting users to complete a data entry form identifying at least one SMTP address.

20. The method of claim 12 wherein said step of generating messages by said sender mail client comprises a webmail client.

21. The method of claim 12 wherein said step of generating messages by said sender mail client comprises a mobile mail client.

22. The method of claim 12 wherein said step of generating messages by said sender mail client comprises an automated/system for generating messages.

* * * * *